US005245747A

United States Patent [19]

Hansson

[11] Patent Number: 5,245,747

[45] Date of Patent: Sep. 21, 1993

[54] DEVICE FOR TIGHTENING THREADED JOINTS

[75] Inventor: Gunnar C. Hansson, Stockholm, Sweden

[73] Assignee: Atlas Copco Tools AB, Stockholm, Sweden

[21] Appl. No.: 830,494

[22] Filed: Feb. 4, 1992

Related U.S. Application Data

[63] Continuation-in-part of Ser. No. 799,701, Nov. 25, 1991, abandoned, which is a continuation of Ser. No. 585,738, Sep. 20, 1990, abandoned.

[30] Foreign Application Priority Data

Sep. 22, 1989 [SE] Sweden ................................ 8903134

[51] Int. Cl.[5] ........................ B23P 21/00; B23Q 15/00

[52] U.S. Cl. ........................................ 29/703; 29/702; 29/709; 29/714; 318/434

[58] Field of Search ................. 29/240, 807, 706, 709, 29/707, 702, 703; 318/434, 254, 293, 599; 388/937

[56] References Cited

U.S. PATENT DOCUMENTS

| | | | |
|---|---|---|---|
| 3,570,101 | 3/1971 | Stead | 29/709 X |
| 3,939,920 | 2/1976 | Hardiman et al. | 29/240 X |
| 4,066,942 | 1/1978 | Bardwell et al. | 318/434 |
| 4,267,629 | 5/1981 | Eshghy | 29/240 X |
| 4,282,640 | 8/1981 | Eshghy | 29/240 X |
| 4,344,216 | 8/1982 | Finkelston | 29/240 X |
| 4,375,120 | 3/1983 | Sigmund | 29/240 X |
| 4,375,122 | 3/1983 | Sigmund | 29/240 X |
| 4,375,123 | 3/1983 | Ney | 29/240 X |
| 4,412,158 | 10/1983 | Jefferson et al. | 318/284 X |
| 4,463,293 | 7/1984 | Hornung et al. | 318/284 |
| 4,829,650 | 5/1989 | Galard | 29/240 X |
| 4,942,346 | 7/1990 | Ardit et al. | 318/293 X |
| 4,952,852 | 8/1990 | Bando et al. | 318/434 X |
| 5,028,854 | 7/1991 | Moline | 318/434 |
| 5,061,885 | 10/1991 | Fukuhara | 318/434 |

*Primary Examiner*—Timothy V. Eley
*Assistant Examiner*—C. Richard Martin
*Attorney, Agent, or Firm*—Frishauf, Holtz, Goodman & Woodward

[57] ABSTRACT

The invention concerns a device for tightening threaded joints in two subsequent steps, namely a first step during which a joint is tightened to a predetermined torque snug level and a second step during which the joint is further tightened up to a final predetermined pretension level. During the second tightening step the angle speed of the power tool (10) is gradually increased at a predetermined rate. The power tool (10) comprises an electric brushless motor which is supplied with power from a variable frequency output inverter (11), and the gradual increase in angle speed of the power tool (10) is accomplished by a gradually increased output frequency and voltage from the power supply means (11).

3 Claims, 2 Drawing Sheets

DEVICE FOR TIGHTENING THREADED JOINTS

CROSS-REFERENCE TO RELATED APPLICATIONS

This application is a continuation in part application of Ser. No. 07/799,701 filed Nov. 25, 1991, which in turn is a continuation of Ser. No. 07/585,738 filed Sep. 20, 1990 (now both abandoned).

BACKGROUND OF THE INVENTION

This invention relates to a device for tightening threaded joints in two subsequent steps, namely a first step during which a joint is tightened to a predetermined torque snug level and a second step during which the joint is further tightened up to a final predetermined pretension level.

The main purpose of the invention is to accomplish a device by which a threaded joint is tightened up to a predetermined pretension level during a second tightening step and by which the stiffness that varies from joint to joint is prevented from causing an undesirable scattering of the obtained pretension level.

By controlling the rotation speed of the tightening tool it is possible to obtain a tightening process which is advantageous also from the ergonomic point of view. The device according to the invention is particularly intended for manually supported tightening tools by which the tiring and uncomfortable jerks normally occurring during the tightening process are eliminated.

The optimum torque speed growth from the ergonomic point of view depends on several parameters such as 1. The strength of the operator.
2. The operator's ability to react fast.
3. The torque level.
4. The torque snug level, if used.
5. The operator's work position.
6. The shut-off speed.

Since there are several parameters involved, it is realized that from the ergonomic point of view it is important to be able to adjust the speed for obtaining a favorable reaction torque characteristic.

The device according to the invention will be described in further detail below with reference to the drawings.

DETAILED DESCRIPTION

Figure 1:
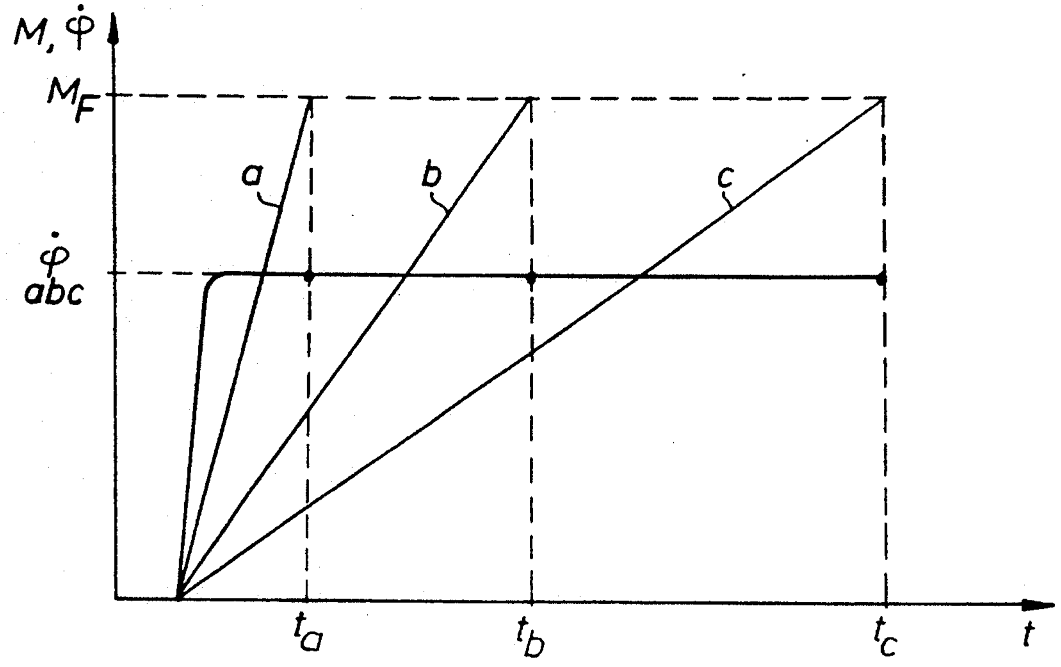
FIG. 1 shows a diagram illustrating the second step of a prior art two-step tightening process carried out on three alternative screw joints.

As being illustrated in FIG. 1, prior art tightening tools accelerate very rapidly at the start of the second tightening step and reaches a constant angle speed level $\dot{\phi}_{abc}$ after a very short time interval. In FIG. 1 there are also illustrated three different screw joints (a), (b), and (c), whereof (a) is a very stiff joint with a steep torque growth characteristic and (b) and (c) are softer joints with less steep torque rates. The diagram in FIG. 1 shows that the angle speed of the tightening tool is the same for all three screw joints as they reach the intended final torque level $M_F$ at the respective points of time $t_a$, $t_b$ and $t_c$. This means that the inertia of the rotating tightening tool parts causes a much larger torque overshoot on the stiff joint (a) than on the soft joint (c). So, depending on the actual joint stiffness the obtained installed torque varies considerably from one joint to another.

Figure 2:
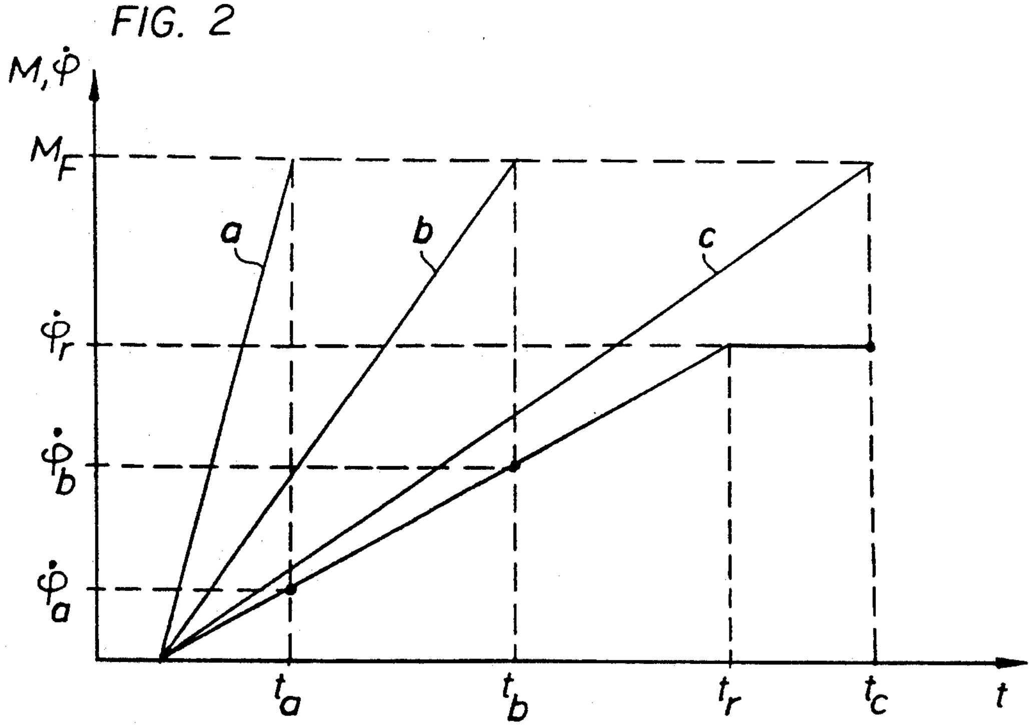
FIG. 2 shows a diagram illustrating the second step of a tightening process carried out on alternative screw joints by a device according to the invention.

In contrast to the prior art tightening tool operating characteristics described above, the invention relates to a tightening tool by which the angle speed during the second tightening step is gradually increased over time. As being illustrated in FIG. 2, the angle speed is increased by such a rate that a maximum speed $\dot{\phi}_r$ is reached at a point of time $t_r$ after the points of time $t_a$ and $t_b$ where the two stiffest joints have reached the intended final torque level $M_F$. This means that the angle speed is lowest for the stiffest joint (a) and highest for the weakest joint (c), resulting in the inertia related torque overshoot at the stiffest joint (a) being about the same as for the weakest joint (c).

Figure 3:
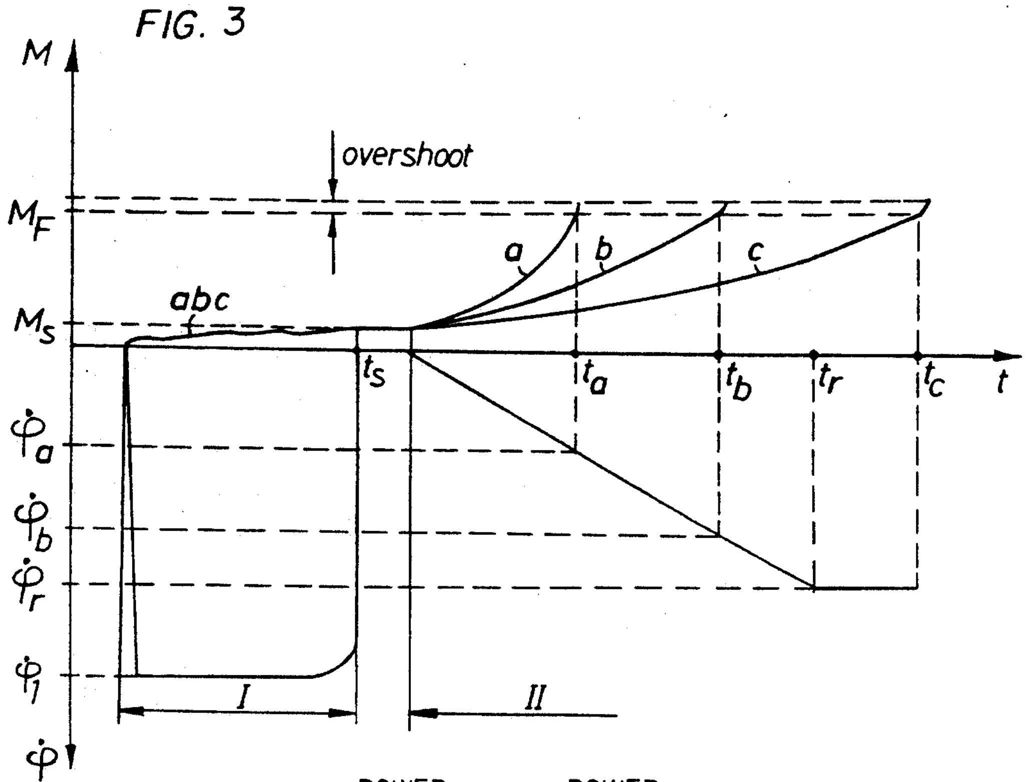
FIG. 3 shows a diagram illustrating a complete tightening process carried out on alternative joints by a device according to the invention.

In FIG. 3 there is shown a three-axes diagram illustrating the relationship between torque designated M, the angle speed designated $\dot{\phi}$ and time t. Following the horizontal time axis, the first tightening step I is illustrated at the left and the second subsequent tightening step II is illustrated at the right. The first tightening step I is carried out at a constant speed $\dot{\phi}_l$ up to a point of time $t_s$ where a torque snug level $M_s$ is reached. Then the torque application from the power tool is interrupted. The first tightening step is completed.

Looking at the angle speed illustrated below the horizontal time axis, there is shown a very steep acceleration of the joint up to an angle speed level $\dot{\phi}_l$ which is kept substantially constant up to the point $t_s$ in which the torque snug level $M_s$ is reached.

When starting the second step, the angle speed of the power tool is successively increased from zero along a preset acceleration ramp. According to the illustration of FIG. 1, the angle speed is gradually increased along a straight line. To illustrate the varying torque reaction from the threaded joints, there are illustrated three different joint characteristics (a), (b), and (c) which represent joints of different stiffness. Curve (a) represents a very stiff joint and (b) and (c) weaker joints.

The threaded joints are intended to be pretensioned up to a final predetermined torque level $M_F$, and dependent on how stiff the torque/angle characteristic of the actual joint the second tightening step will last for different time intervals. This means that the weakest joint c will take the longest time to finish, while joint (a) with the steepest torque/angle characteristic will be finished in the shortest time $t_a$.

Looking now at the most significant features of the present invention, it is to be noted that due to the speed characteristic of the tightening tool, the angle speed will be significantly different at the end of the second tightening step for the different joints. The final pretension level is reached very quickly at joint (a) which has a steep torque/angle characteristic. This means in turn that the final angle speed $\dot{\phi}_a$ is low as is the kinetic energy of the rotating parts of the power tool.

On the other hand, joint (c) takes a longer time to reach the level $M_F$, which means that the final angle speed $\dot{\phi}_c$ and thereby the kinetic energy of the rotating parts of the tool is much higher than the final speed for joint (a).

The resultant advantage of the new device according to the invention is that for a stiff joint, which reaches its final pretension level very quickly, the angle speed at the end of the tightening process is kept low and the final torque overshoot is substantially reduced, whereas the end speed at a weak joint, which reaches its final pretension level less abruptly, is higher. Because of the weak characteristic of the latter, the kinetic energy of the rotating tool parts will not cause any significant torque overshoot despite a relatively high final angle speed.

Figure 4:
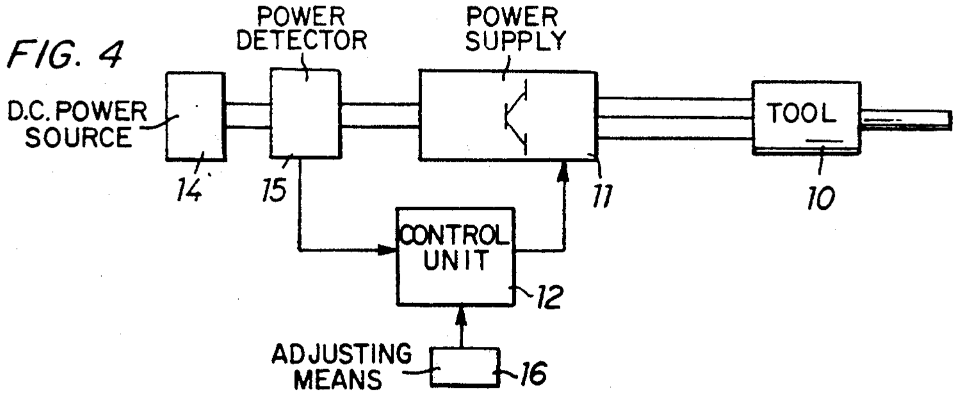
FIG. 4 shows schematically a device according to one embodiment of the invention.

The device illustrated in FIG. 4 comprises an electrically powered tightening tool 10 comprising a brushless AC-motor, a power supply means 11 and a control unit 12. The power supply means 11 comprises an inverter which is fed with DC power from a DC power source 14 and which delivers AC power of variable frequency and voltage amplitude to the tool 10.

A power detecting means 15 is provided between the DC power source 14 and the power supply means 11 and is connected to the control unit 12. To the latter there is also connected an adjusting means 16 by which a desirable rate of speed change may be set. This is accomplished by changing the output frequency and voltage from the power supply means 11.

The control unit 12 comprises a programmable processor in which all other data necessary for a two-step tightening process are installed.

Figure 5:
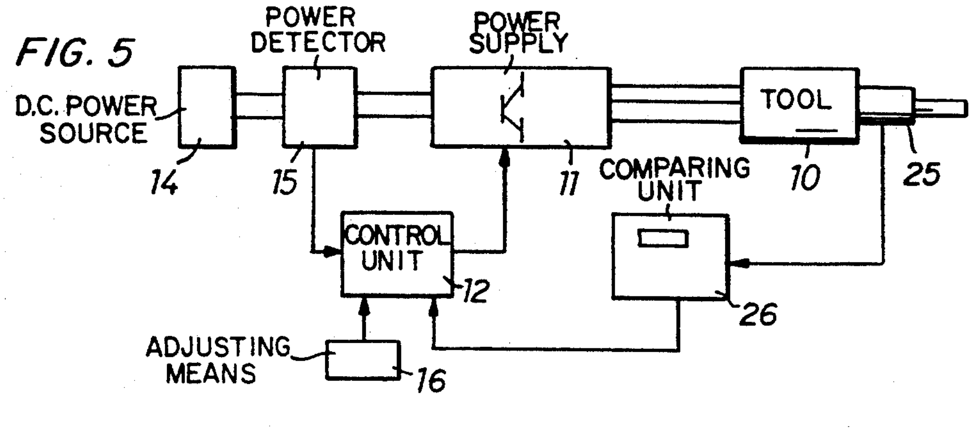
FIG. 5 shows a device according to another embodiment of the invention.

The device illustrated in FIG. 5 differs from the device in FIG. 4 in that the power tool carries a sensing means 25 for detecting the actual torque values during operation of the tool. This sensing means 25 is connected to a comparing unit 26 in which the actual sensed torque value is compared to a desired set value. As the actual sensed value reaches the preset value a shut-off signal is delivered to the control unit 12.

I claim:

1. Apparatus for tightening a threaded joint in two subsequent tightening steps, namely a first tightening step up to a torque snug level and a second tightening step up to a predetermined pretension level, comprising:
- a power tool (10) comprising an electric brushless motor for providing a variable speed output;
- a variable output, controllable, power supply means (11) coupled to said power tool (10) for supplying an electrical output power to said power tool; and
- control means (12) coupled to said power supply means (11) for controlling the electrical output power of said power supply means (11), said control means (12) including a programmable unit which is arranged to cause said power supply means (11) to provide a gradual change, in relation to time, of a speed related parameter so as to cause the speed of said power tool output to gradually accelerate during substantially the entire second tightening step.

2. The apparatus of claim 1, further comprising adjusting means (16) coupled to said control means (12) for setting a time related changing rate of said speed related parameter.

3. The apparatus of claim 2, wherein said control means comprises a programmable microprocessor means for providing a ramp signal for gradually increasing said speed related parameter.

* * * * *